(12) United States Patent
Rondeau et al.

(10) Patent No.: US 6,786,629 B2
(45) Date of Patent: Sep. 7, 2004

(54) AUTOMATED CEMENT MIXING SYSTEM

(75) Inventors: Joel Rondeau, Anthony (FR); Pierre Vigneaux, Moisenay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 10/260,332

(22) Filed: Sep. 30, 2002

(65) Prior Publication Data

US 2003/0072208 A1 Apr. 17, 2003

Related U.S. Application Data

(63) Continuation-in-part of application No. 09/726,784, filed on Nov. 29, 2000, now Pat. No. 6,491,421.

(51) Int. Cl.$^7$ .................................................. B28C 7/04
(52) U.S. Cl. ........................... 366/8; 366/17; 366/18; 366/136; 366/141; 366/153.1
(58) Field of Search ......................... 366/8, 17, 136, 366/137, 141, 152.2, 152, 152.6, 153

(56) References Cited

U.S. PATENT DOCUMENTS

| | | | | |
|---|---|---|---|---|
| 3,379,421 A | * | 4/1968 | Putman | 366/18 |
| 4,327,759 A | * | 5/1982 | Millis | 366/152.2 |
| 4,353,482 A | * | 10/1982 | Tomlinson et al. | |
| 4,397,561 A | * | 8/1983 | Strong et al. | 366/152.2 |
| 4,475,818 A | * | 10/1984 | Bialkowski | 366/152.1 |
| 4,490,044 A | * | 12/1984 | Saito et al. | |
| 4,764,019 A | * | 8/1988 | Kaminski et al. | 366/136 |
| 4,779,186 A | * | 10/1988 | Handke et al. | 366/152.2 |
| 4,863,277 A | * | 9/1989 | Neal et al. | 366/137 |
| 4,881,819 A | * | 11/1989 | Blees | 366/152.2 |
| 4,886,367 A | * | 12/1989 | Bragg et al. | 366/137 |
| 4,896,968 A | * | 1/1990 | Baillie | 366/136 |
| 5,018,868 A | * | 5/1991 | Baillie | 366/136 |
| 5,570,743 A | * | 11/1996 | Padgett et al. | |
| 5,590,976 A | * | 1/1997 | Kilheffer et al. | 366/18 |
| 5,775,803 A | * | 7/1998 | Montgomery et al. | |
| 6,491,421 B2 | * | 12/2002 | Rondeau et al. | 366/8 |

FOREIGN PATENT DOCUMENTS

| | | | |
|---|---|---|---|
| DE | 195 12 416 | * | 4/1995 |
| EP | 0 403 283 | * | 12/1990 |

OTHER PUBLICATIONS

Note: "X" indicated whereby these documents were cited in the parent application, Applicant did not supply an IDS listing.*

* cited by examiner

Primary Examiner—Tony G. Soohoo
(74) Attorney, Agent, or Firm—Thomas O. Mitchell; Robin Nava; Brigitte L. Echols

(57) ABSTRACT

A method for continuously mixing a borehole fluid such as cement includes using a measurement of the solid fraction of a cement slurry as it is being mixed to determine the ratio of the solid and liquid components to be added to the slurry. A system for mixing the slurry includes a liquid material (water) supply including a flow meter; a solid material (cement) supply; a mixer which receives the liquid and solid materials and includes an output for delivering materials from the mixer to a delivery system; a device for measuring the amount of material in the mixer; and a flow meter in the output; wherein measurements from the flow meters and the device for measuring the amount of material in the mixer are provided to a control system which provides control signals to automatically control the amount of solid and/or liquid material added to the mixer.

24 Claims, 4 Drawing Sheets

AUTOMATED CEMENT MIXING SYSTEM

REFERENCE TO RELATED APPLICATIONS

This application is a continuation in part of U.S. Ser. No. 09/726,784 filed Nov. 29, 2000, now U.S. Pat. No. 6,491,421 and assigned to the assignee of the present application.

FIELD OF THE INVENTION

The present invention relates to a system for mixing fluids containing solid and liquid materials such as cement. In particular the invention provides an automated system for the continuous mixing of cements or other fluids used in the drilling, completion or stimulation of boreholes such as oil or gas wells.

BACKGROUND OF THE INVENTION

When a well such as an oil or gas well has been drilled, it is often desired to isolate the various producing zones form each other or from the well itself in order to stabilise the well or prevent fluid communication between the zones or shut off unwanted fluid production such as water. This isolation is typically achieved by installing a tubular casing in the well and filling the annulus between the outside of the casing and the wall of the well (the formation) with cement. The cement is usually placed in the annulus by pumping a slurry of the cement down the casing such that it exits at the bottom of the well and passes back up the outside of the casing to fill the annulus. While it is possible to mix the cement as a batch prior to pumping into the well, it has become desirable to effect continuous mixing of the cement slurry at the surface just prior to pumping into the well. This has been found to provide better control of cement properties and more efficient use of materials.

The cement slurries used in such operations comprise a mixture of dry and liquid materials. The liquid phase is typically water and so is readily available and cheap. The solid materials define the slurry and cement properties when added to the water and mixed, the amount of solid materials in the slurry being important. Since the liquid phase is constant, the amount of solid material added is usually monitored by measuring the density of the slurry and maintaining this at the desired level by controlling the amount of the solid material being added. FIG. 1 shows a schematic diagram of a prior art mixing system. In the system of FIG. 1, mix water is pumped from a feed supply 10 via a pump 12 to a mixer 14 which feeds into a mixing tub 16. The feed supply 10 comprises a pair of displacement tanks 11, 11' each with separate outlets connected to a valve 13 which in turn feeds the pump 12. Two methods are commonly used to determine the amount of water supplied:

1. Proximity switches installed on the shaft of the pump 12 count a number of pulses per rotation. Each pulse corresponds to a displacement volume. This method is sensitive to pump efficiency.
2. Displacement volume is measured by counting the number of tanks pumped down-hole. This measurement method is sensitive to human error in level reading, switching from on tank to another and tank exact capacity. Even more an error in the number of tanks counted can have many consequences (over displacement can result in wet shoe, under displacement can result in no pressure bump or cement left in the casing).

Solid materials are delivered to the mixer 14 from a surge can 18 or directly from a cement silo via a flow control valve 20 and are carried into the mixing tub 16 with the mix water. The contents of the mixing tub 16 are recirculated through a recirculation pipe 22 and pump 24 to the mixer 14. The recirculation pipe 22 also includes a densitometer 26 which provides a measurement of the density of the slurry in the mixing tub 16. An output 28 is provided for slurry to be fed from the mixing tub 16 to further pumps (not shown) for pumping into the well. Control of the slurry mixture is achieved by controlling the density in the mixing tub 16 as provided by the densitometer 26 by addition of solid material so stay at a predetermined level for the slurry desired to be pumped. The densitometer 26 is typically a non-radioactive device such as a Coriolis meter.

While this system is effective for slurries using materials of much higher density than water, it is not effective for slurries using low density solid materials, especially when the density of the solids is close to that of water. In such cases, a density measurement is not sensitive enough to control the amounts of solid material added to the necessary accuracy.

The present invention seeks to provide a mixing system which avoid the problem of density measurement described above.

SUMMARY OF THE INVENTION

In its broadest aspect, the present invention comprises using a measurement of the solid fraction of a fluid as it is being mixed to determine and control the ratio of the solid and liquid components added to the slurry.

The invention is particularly applicable to the mixing of borehole cement slurries, in which case, solids fraction is determined as (slurry vol−water vol)/slurry vol. An alternative but related parameter is porosity, determined as water vol/slurry vol (porosity+solids fraction=1).

A system for mixing cement in accordance with the invention comprises i) a liquid material supply including means for controlling the flow of liquid therefrom in response to a first control signal, and a first flow meter for determining the flow rate of liquid supplied therefrom and generating a first flow rate signal;

ii) a solid cement supply including means for controlling the flow of solid cement supplied therefrom in response to a second control signal;

iii) a mixer which receives the liquid and solid cement from the liquid material supply and solid cement supply respectively and mixes them to form a slurry, and includes and output for delivering materials from the mixer, a second flow meter being located in the output for determining the flow rate of slurry from the mixer and generating a second flow rate signal;

iv) a device for determining the variation over time of the amount of slurry in the mixer and generating a mixer content signal;

v) a delivery system connected to the output of the mixer for delivering the slurry to a well; and vi) a monitoring system which determines the ratio of solid cement and liquid in the mixer from the first and second flow rate signals and the mixer content signal, and generates the first and second control signals to operate the means for controlling the flow of liquid and means for controlling the flow of cement so as to control the relative amounts of solid cement and liquid material added to the mixer according to the determined ratio of solid cement and liquid in the mixer.

The flow meters can be mass flow meters or volumetric flow meters. Any suitable form of meter can be used, for example Coriolis meters or electromagnetic meters.

The mixer will typically include a tank or tub, in which case the device for measuring the amount of material in the mixer can be a level sensor. Such a level sensor is preferably a time domain reflectometry- or radar-type device although acoustic or float devices can also be used. It is preferred to mount such a device in an arrangement for damping transient fluctuations in the tank level, for example in an arrangement of concentric slotted tubes. An alternative or additional form of sensor can be a load cell which can be used to indicate the weight of the tank, or a pressure sensor.

The device for measuring the amount of liquid supplied can be a flow meter or a level sensor of the types described above. When the liquid supply includes one or more displacement tanks, a level sensor is preferred Where the mixer includes some form of recirculation of the slurry through the tank, it is important that the output flow meter is downstream of this recirculation.

Where the solid materials comprise cement and other solid additives added separately to the mixer, separate flow meters can also be provided for each separate supply of additives.

The measurement of solid fraction is used to control the addition of solids and/or liquid components directly by means of an automatic control system. This is achieved by the use of sensor signals (flow rates, position sensors, etc.) and control signals for operating valves or the like, linked together by means of a process control system in which the calculation of solids fraction is embodied.

DESCRIPTION OF THE PREFERRED EMBODIMENT

Figure 1:
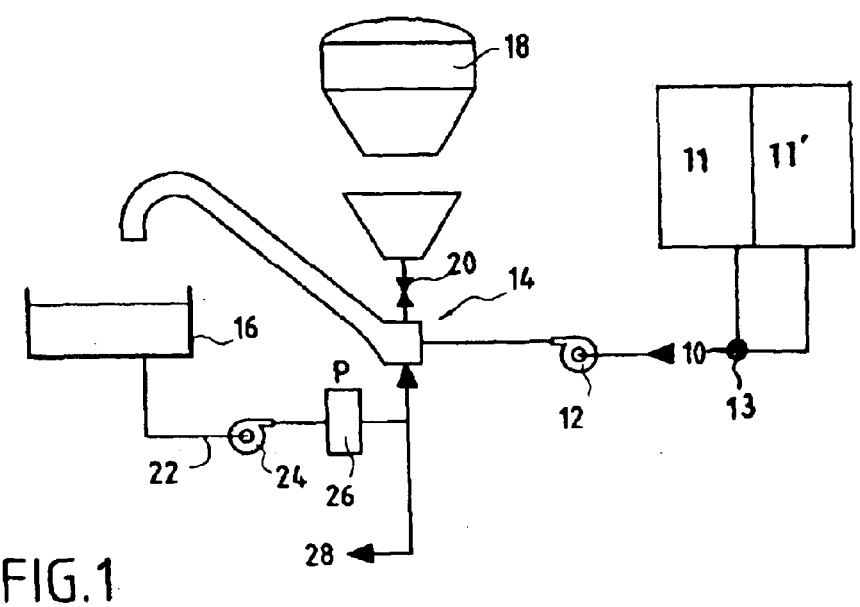
FIG. 1 shows a prior art mixing system.
Figure 2:
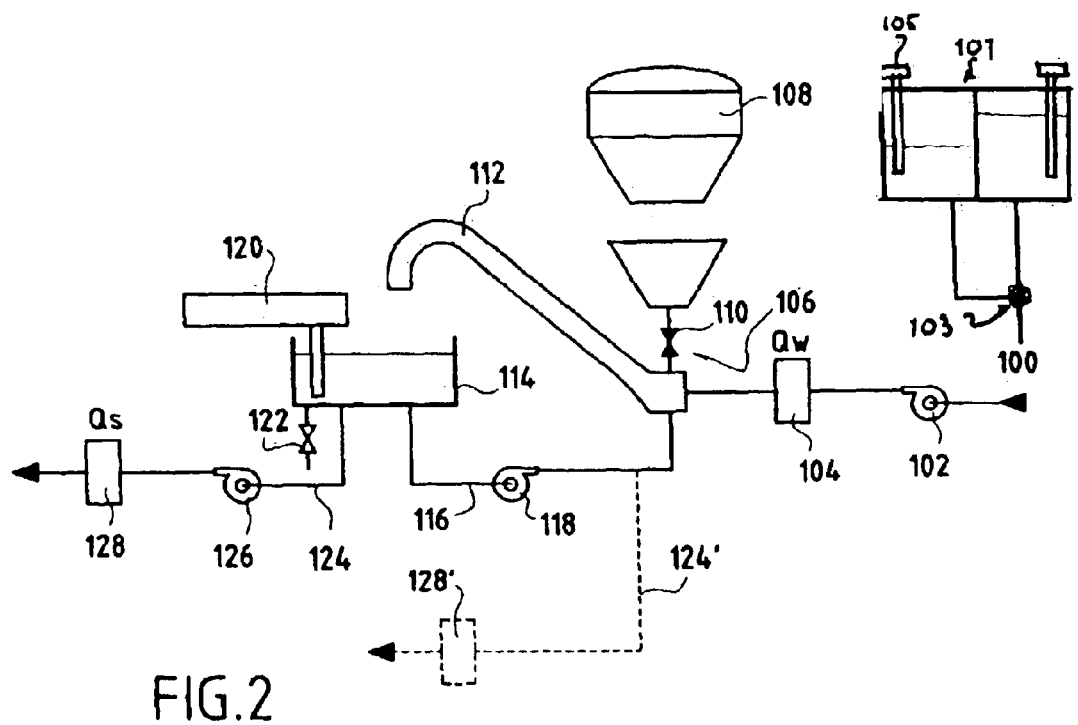
FIG. 2 shows a mixing system according to a first embodiment of the invention.

The system shown in FIG. 2 is used for the continuous mixing of cement for oil well cementing operations and comprises a supply of mix water 100 feeding, via a pump 102 and a flow meter 104 to a mixing system 106.

The supply of mix water comprises a pair of displacement tanks 101, each having a separate output connected to a valve 103 which supplies the pump 102. Level sensors 105 are included in each displacement tank 101 for determining the amount of water supplied to the pump 102. In another version (not shown), the level sensors are omitted. The amount of water supplied is determined in the manner described below.

It will be appreciated that the exact form of water supply is not critical, provided that the appropriate flow rate signals can be output and the appropriate level of control of the supply effected.

The mixing system 106 also receives solid materials from a surge can 108 (or alternatively directly from a surge can) which are admitted through a valve 110. The mixed solid and liquid materials are delivered through a feed pipe 112 to a mixing tub 114. The mixing tub 114 has a first outlet 116 connected to a recirculation pump 118 which feeds the slurry drawn from the tub 114 back into the mixing system. The tub 114 is provided with a level sensor 120 and/or a load sensor 122 to provide an indication of the tank contents and any change in contents over time. A second output 124 is provided from the tub 114 which leads, via a second pump 126 and a second flow meter 128 to the pumping system from which it is delivered to the well (not shown). An alternative method of delivery (shown in dashed line in FIG. 2) has an output 124' taken from the recirculation line via a flow meter 128' to the well. Other arrangements are also possible. The pumps 102, 118, 126 are of the usual type found in well cementing systems, for example centrifugal pumps. Likewise, the flow meters 104, 128' are conventional, for example Coriolis meters such as those that have been used as densitometers in previous applications. Different types of pumps and meters each have advantages and disadvantages that are well known in the art and can be selected according to requirements.

Figure 3:
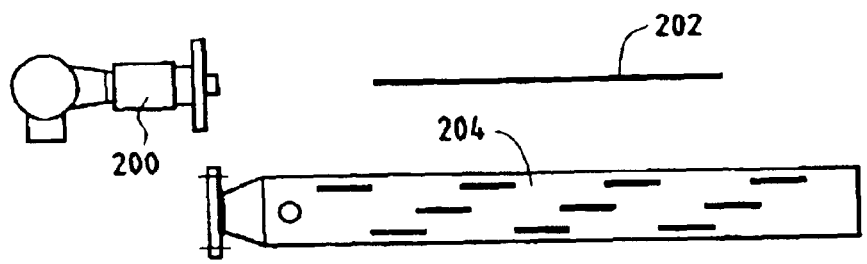
FIG. 3 shows the components of a tank level sensor.
Figure 4:
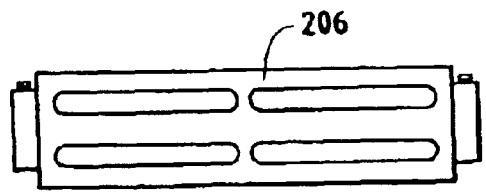
FIG. 4 shows the components of the level sensor assembled.
Figure 4:
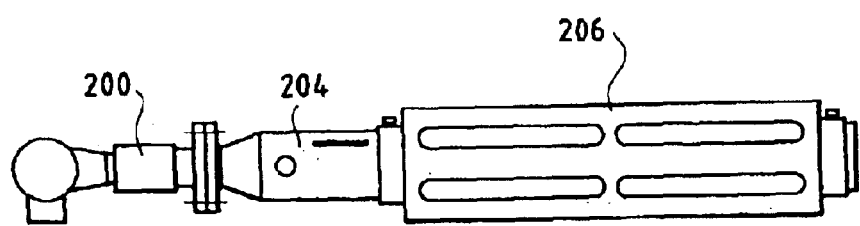
Figure 5:
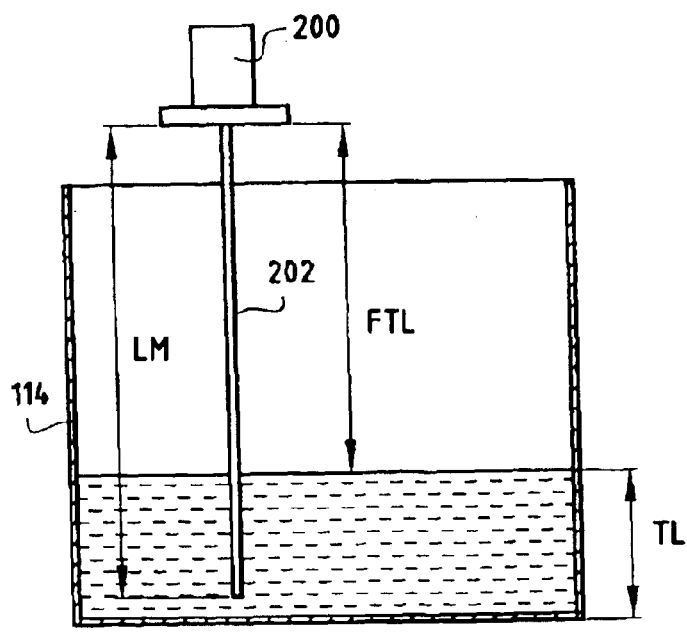
FIG. 5 shows a schematic of the tank level measurement.

FIGS. 3–5 show details of the level sensors used in the displacement tanks and tub and the manner of installation. The sensor comprises a Krohne radar sensor 200, a stainless steel rod 202, an inner slotted sleeve 204 and an outer slotted sleeve 206. The rod 202 is screwed onto the sensor 200 and the inner sleeve 204 mounted over the rod 202 and attached to a flange on the sensor 200. The outer sleeve 206 is mounted over the inner sleeve 204 to which it is attached.

For use in the displacement tanks, each displacement tank receives a level sensor. This sensor gives an accurate measurement of the liquid level in the tank. The exact volume versus level is required to calculate the displaced volume. In case the tank cross section profile is not accurately known a so-called tank calibration is performed. A water meter equipped with a digital output measures the exact displacement tank volume versus tank level. This operation is performed only once for each tank. To supply water to the system, the valve 103 is operated to allow water to flow from one or other tank to the pump 102. When a tank discharge valve is opened, a device such as an end switch, pressure switched or any other appropriate device is used to begin calculation of the displacement volume. Displacement volume is then computed as:

$$\Sigma(V(h1n) - V(h2n))$$

Where:
V(h) is the exact volume of the tank at level (h)
h1n start level of the n th displaced tank volume
h2n stop level of the n th displaced tank volume
When the level in the tank in use becomes low, the supply is switched to the other tank.

Switching operation from one tank to another can either be manual or automated and when one tank is emptying the other one is filled up for further use. Since the level sensors can be used to give an instantaneous measurement of the amount of water provided to the system, it is possible to confirm the data provided by the flow meter 104, or even to replace the need for this flow meter completely. When the flow meter is present, it is not essential to have the level sensors in the displacement tanks.

This method of determining the displacement volume can be applied to other forms of cementing operation than the ones described here, and has the advantage that it is relatively insensitive to pump efficiency or operator error as found in the previous systems.

For use in the mixing tub, the sensor arrangement is installed in the mixing tub 114 in the vertical position and in a location where the slurry is renewed as the mixing occurs, to avoid location in a dead zone where cement might set. The sensor provides a measurement of the difference between the length of the rod 202 (LM) and the level of slurry in the tub level (TL). The free tub level (FTL) is obtained by:

$$FTL = LM - TL.$$

It will be appreciated that the exact form of level sensor is not important to the overall effect of the invention. What is important is to obtain an indication of the variation versus time of the tub slurry volume (called "tub flow" in this document). This can be obtained using a float or a load sensor or combinations of any of these or any other sensor giving this information.

The outputs of the flow sensors and level sensors are used to monitor the solid fraction of the slurry in the following manner:

The solid fraction computation is based on the balance between incoming and outgoing volumes (or flow rates) as expressed in the following relationship:

$$Q_{water} + Q_{cement} = Q_{slurry} + Q_{tub}$$

where $Q_{tub}$ is the tub rate.

Tub rate is the variation versus time of the tub volume and is considered as positive while the tub level increases and negative while it decreases. The smaller the tub cross section, the more sensitive the measurement will be to change. $Q_{tub}$ is given by:

$$Q_{tub} = S_{tub} \frac{dh_{tub}}{dt}$$

where $S_{tub}$ is the tub cross section and $$\frac{dh_{tub}}{dt}$$

is the tub level variation over time. In the simplest case, the tub section is constant and the tub rate becomes the product of the tub level variation/time and the tub cross section.

The solids fraction at time t is computed as the ratio of (slurry vol−water vol) over the total slurry volume present at time t in the tub. The variation in tub slurry volume $V_{tub}(t+\delta t) - V_{tub}(t)$ can be expressed as:

$$V_{tub}(t+\delta t) - V_{tub}(t) = \lfloor Q_{water}(t) + Q_{cement}(t) - Q_{slurry}(t) \rfloor * \delta t$$

which can be rewritten as:

$$V_{tub}(t+\delta t) - V_{tub}(t) = Q_{tub}(t) * \delta t.$$

In the same way, the variation in the water volume present in the tub at time t $V_{water}(t+\delta t) - V_{water}(t)$ is equal to the incoming water volume minus the amount of water present in the slurry leaving the tub, and can be expressed as:

$$V_{water}(t+\delta t) - V_{water}(t) = \lfloor Q_{water}(t) - (1 - \text{SolidFraction}(t)) * Q_{slurry}(t) \rfloor * \delta t.$$

Solid Fraction is then expressed as:

$$\text{SolidFraction}(t + \delta t) =$$

$$1 - \frac{V_{water}(t) + \lfloor Q_{water}(t) - (1 - \text{SolidFraction}(t)) * Q_{slurry}(t) \rfloor * \delta t}{V_{tub}(t) + Q_{tub}(t) * \delta t}$$

The calculation requires that the initial conditions be known if it is to be accurate ab initio, i.e. is the tub empty, full of water or containing slurry already. The calculation will ultimately stabilise independently of the initial conditions, the time taken to do this depending on the tub volume and the output flow rate $Q_{slurry}$.

These calculations are conveniently performed using a computer, in which case the measurements can be provided directly from the sensors via a suitable interface. A preferred screen display will show the various flow rates or levels, together with the desired solids fraction (calculated when designing the slurry). The mixing process is controlled by adjusting the amount of cement and/or water added to the mixer so as to maintain the calculated solids fraction at the desired level. Alternatively, the results of the calculations can be fed to an automatic control system which adjusts the rate at which the components are delivered to the mixing system.

Figure 6:
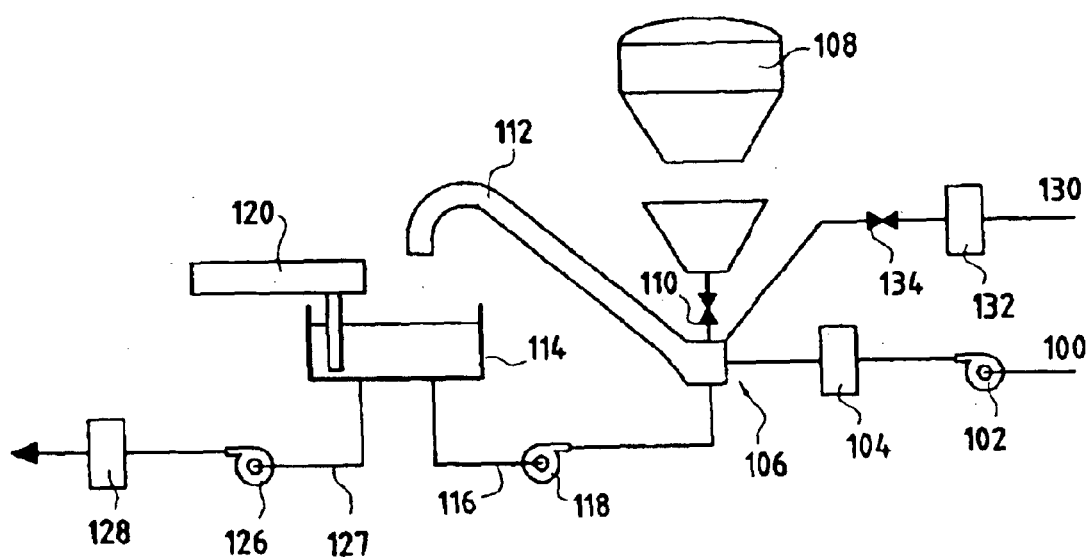
FIG. 6 shows a mixing system according to a second embodiment of the invention.

The system described above works well when the dry ingredients (blend of cement+additives) are delivered pre-mixed to the well site from another location. In this case essentially the same measurements and calculations as described above are performed, merely substituting $Q_{blend}$ for $Q_{cement}$. If it is desired to mix the dry materials on site as part of the continuous mixing process, a slightly different approach is required. FIG. 6 shows a mixing system according to another embodiment of the invention and uses a numbering scheme which follows that of FIG. 2. The system of FIG. 6 comprises an additional dry material supply 130 which admits the dry products to the mixing system 106 via a mass flow meter 132 (other flow measurement means can also be used) and a control valve 134. In this case, the basic control equation becomes:

$$Q_{water} + Q_{additive} + Q_{cement} = Q_{tub} + Q_{slurry}$$

where four of the five variables are know and $Q_{cement}$ is the most difficult parameter to measure accurately. Where multiple dry additives are to be added, the supply can comprise separate material supplies, each with a flow meter and valve. Additional terms $Q_{additive1}$, $Q_{additive2}$, etc., are included in the control equation.

It will be appreciated that changes can be made in implementation while still remaining within the scope of using solid fraction as the property monitored to effect control of the mixing.

Figure 7:
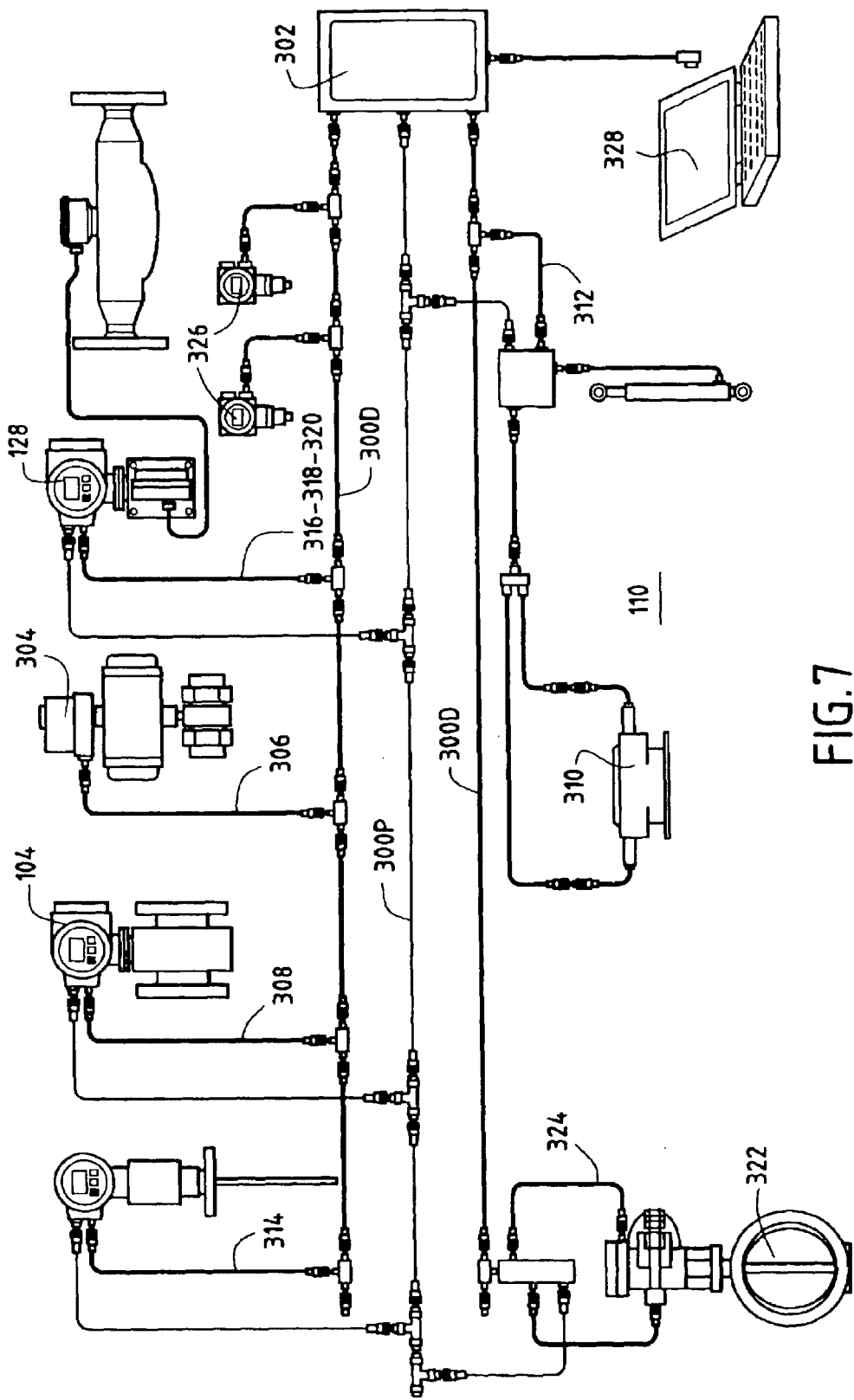
FIG. 7 shows a control system as used in an embodiment of the invention.

FIG. 7 shows a schematic view of an automatic control system according to an embodiment of the invention. This control system is applied to the mixing systems of FIGS. 2 and 6 described above and operates according to the method described above, and in more detail below, to control the mixing system. The system shown in FIG. 7 comprises a power P and data D backbone 300 which is connected to a process control system 302. The various measurement and control elements of the mixing system are connected to this backbone as shown. For example, when considering the system of FIG. 2, a mix water valve 304 (part of pump element 102) is connected to control the amount of water admitted to the mixer in response to a first control signal 306 from the process control system 302. The flow meter 104 provides a first flow rate signal 308 to the process control system 302 to complete the control loop for mix water and for determination of solids fraction.

The valve 110 for controlling the supply of solid cement to the mixer 106 typically comprises a knife gate valve and is provided with a hydraulic control system (not shown) which operates under the control of a second control signal 310 from the process control system 302. An LDVT device (also not shown) is attached to the knife gate valve and outputs a knife gate position signal 312 to the process control system 302 to complete the control loop.

The level sensor 120 in the tub 114 outputs a mixer content signal 314 to the process control system 302 for use in determining the variation over time of the tub contents and hence the solids fraction.

The second flow meter 128 provides a second flow rate signal 316 to the process control system 302. This allows determination of the solids fraction in the manner described above and hence control of the mixing process. The second flow meter 128 can also output density and temperature signals 318, 320, depending on the particular type of meter used. These further signals can be useful in monitoring the progress of a mixing operation.

A slurry valve 322 can be provided between the mixer 106 and the pumping system (not shown in FIG. 2) in case it is desired to isolate the mixing system from the delivery system should the variation of solids fraction or other property of the slurry exceed preset limits. This valve operates under a third control signal 324 from the process control system 302.

A plurality of system monitor sensors 326 (two are shown, more can be provided if required) can be provided throughout the mixing system to ensure that the system is full of slurry and in a stable operating condition such that accurate control under the automatic system can be effective. These sensors can comprise, for example, pressure sensors located in flow lines.

A user interface 328 is connected to the process control system 302. This can be a separate computer, or if the process control system is self-contained, an input device such as a touch screen, which allows the user to input operational parameters (e.g. desired solids fraction, slurry pumping rate, etc.) which allow the process control system 302 to determine the appropriate control signals. Also, one or more displays can be generated indication the state of operation of the mixing system or the progress of the mixing job.

When the solids supply includes separate supplies of cement and solid additives (see FIG. 6, for example), a fourth flow rate signal can be generated to indicate the flow of additives as an input to the control system.

It will be appreciated that the exact form of backbone and process control system can be selected according to various requirements and no particular form is essential for the purpose of the invention. The addition of further measurements and controls is likewise at the discretion of the user.

What is claimed is:

1. A system for mixing a cement slurry in a well cementing operation, comprising:
   i) a liquid material supply including means for controlling the flow of liquid therefrom in response to a first control signal, and a first flow meter for determining the flow rate of liquid supplied therefrom and generating a first flow rate signal;
   ii) a solid cement supply including means for controlling the flow of solid cement supplied therefrom in response to a second control signal;
   iii) a mixer which receives the liquid and solid cement from the liquid material supply and solid cement supply respectively and mixes them to form a slurry, and includes and output for delivering materials from the mixer, a second flow meter being located in the output for determining the flow rate of slurry from the mixer and generating a second flow rate signal;
   iv) a device for determining the variation over time of the amount of slurry in the mixer and generating a mixer content signal;
   v) a delivery system connected to the output of the mixer for delivering the slurry to a well; and
   vi) a monitoring system which determines the ratio of solid cement and liquid in the mixer from the first and second flow rate signals and the mixer content signal, and generates the first and second control signals to operate the means for controlling the flow of liquid and means for controlling the flow of cement so as to control the relative amounts of solid cement and liquid material added to the mixer according to the determined ratio of solid cement and liquid in the mixer.

2. A system as claimed in claim 1, further comprising a data communication backbone for directing signals to and from the monitoring system.

3. A system as claimed in claim 1, further comprising a power supply leading from the monitoring system and under the control thereof.

4. A system as claimed in claim 1, wherein the second flow meter also outputs density and temperature signals.

5. A system as claimed in claim 1, further comprising means for controlling flow disposed between the mixer and the delivery system and operated by means of a third control signal generated by the monitoring system.

6. A system as claimed in claim 1, further comprising at least one system monitor sensor which outputs a system status signal to the monitoring system indicative of the operation of at least part of the mixing system.

7. A system as claimed in claim 1, wherein the means for controlling the flow of solid cement comprises a knife gate, including a knife gate control for operating the knife gate in response to the second control signal, and a knife gate position sensor which outputs a knife gate position signal which is used by the monitoring system to generate the second control signal.

8. A system as claimed in claim 1, further comprising a user interface allowing a user to select operational settings and output user input signals to the monitoring system for use in generating the first and second control signals.

9. A system as claimed in claim 1, wherein the monitoring system determines the solids fraction of the slurry in the mixer as the ratio of solid cement and liquid.

10. A system as claimed in claim 1, wherein at least one of the flow meters is a mass flow meter.

11. A system as claimed in claim 1, wherein at least one of the flow meters is a volumetric flow meter.

12. A system as claimed in claim 1, wherein at least one of the flow meters is an electromagnetic flow meter.

13. A system as claimed in claim 1, wherein at least one of the flow meters is a Coriolis meter.

14. A system as claimed in claim 1, wherein the means for controlling the flow of liquid from the liquid supply comprises a pump and a valve.

15. A system as claimed in claim 1, wherein the delivery system comprises a pump.

16. A system as claimed in claim 1, wherein the mixer comprises a mixing section and a mixing tub, mixed materials being fed from the mixing section to the mixing tub, and a portion of the materials in the tub being recirculated to the mixing section.

17. A system as claimed in claim 16, wherein the device for measuring the amount of material in the mixer measures the amount of materials in the tub.

18. A system as claimed in claim 17, wherein the device comprises a level sensor in the tub.

19. A system as claimed in claim 18, wherein the device measures the variation in the amount of materials in the tub over time.

20. A system as claimed in claim 16, wherein recirculation of material takes place upstream of the second flow meter.

21. A system as claimed in claim 1, wherein the supply of solid cement comprises separate supplies of cement and dry additives, a flow meter being provided to measure the rate of flow of the dry additives and provide a fourth flow rate signal to the monitoring system which is used to generate the control signals.

22. A system as claimed in claim 21, wherein the supply of dry additives comprises multiple separate supplies of additives, each with its own flow meter.

23. A system as claimed in claim 1, wherein the liquid supply includes at least one tank.

24. A system as claimed in claim 23, wherein the first flow meter measures the amount of liquid flowing from the tank.

\* \* \* \* \*